Nov. 27, 1951   E. S. GRILLEY   2,576,397
VEHICLE BODY BRACE
Filed Oct. 6, 1948

Inventor
EDMUND S. GRILLEY

By Ahley & Ahley
Attorneys

Patented Nov. 27, 1951

2,576,397

UNITED STATES PATENT OFFICE 2,576,397

VEHICLE BODY BRACE

Edmund S. Grilley, Fort Worth, Tex., assignor to Hobbs Manufacturing Company, Fort Worth, Tex., a corporation of Texas Application October 6, 1948, Serial No. 53,121

4 Claims. (Cl. 296—40)

The invention relates to new and useful improvements in braces for vehicle bodies.

One object of the invention is to provide an improved brace for a vehicle body which is of such construction that the same may be readily removed whenever desired.

Another object of the invention is to provide an improved brace for detachably connecting the sides of an open vehicle, which brace is self-contained whereby the same may be attached to vehicle sides of any type without altering the construction of said sides.

A further object of the invention is to provide an improved brace, of the character described, having brackets adapted to be engaged over and attached to the side racks or panels of a vehicle for connecting and reinforcing the same.

A construction designed to carry out the invention will be hereinafter described together with other features of the invention.

Figure 1:
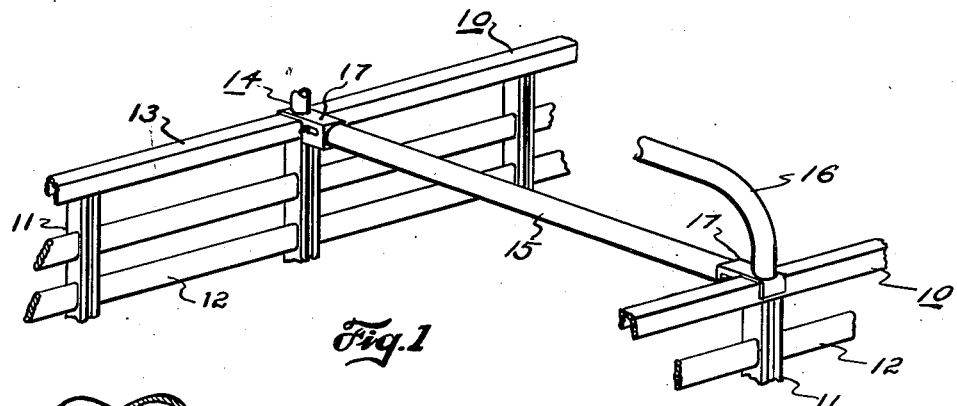
Figures 2, 3:
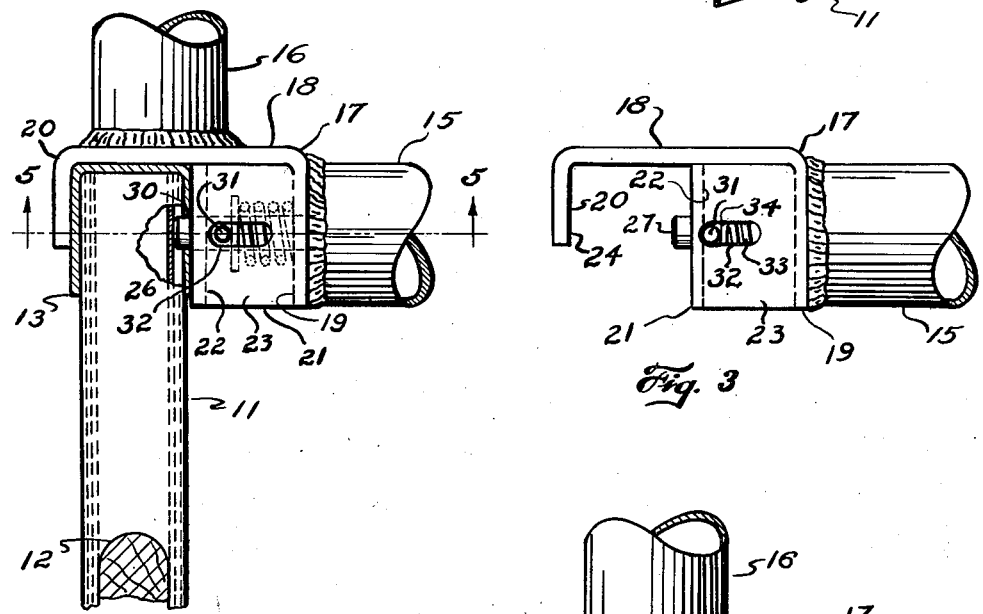
Figure 5:
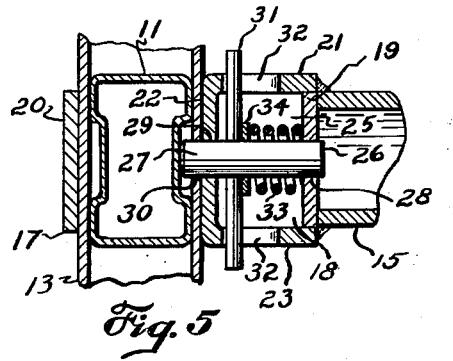
Figure 4:
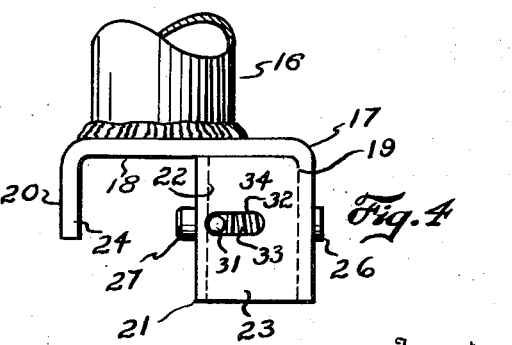

The invention will be more readily understood from a reading of the following specification and by reference to the accompanying drawing, wherein an example of the invention is shown, and wherein:

Fig. 1 is a perspective view of a brace, constructed in accordance with the invention, and shown connecting the sides of a vehicle, Fig. 2 is a view, partly in elevation and partly in section, showing one of the brackets of the brace and its relation to the vehicle side, Fig. 3 is a side elevation of one of the brackets of a modified brace, Fig. 4 is a view, similar to Fig. 3, of another form of brace, and Fig. 5 is a horizontal, cross-sectional view, taken on the line 5—5 of Fig. 2.

In the drawing, the numeral 10 designates the side racks or panels of a vehicle, such as a trailer, which have upright posts or stakes 11 with longitudinal slats or bars 12 carried by the stakes. A top rail 13 of channel form overlies and connects the upper ends of the stakes 11 and the latter are adapted to engage the bed or body (not shown) of the vehicle for supporting the racks. The latter are more or less conventional and, per se, form no part of the present invention.

A transverse brace 14 is provided for connecting the upper edge portions or channels 13 of the racks and includes one or more rods or members 15 and 16 which are preferably tubular, being formed of pipe or other suitable material. The rod 15 is straight, while the rod 16 is arched or bowed and is of greater length than said rod 15 so as to extend beyond the ends thereof and overlie the channels. A bracket or connecting element 17, preferably of inverted U-shape, is welded or otherwise secured to each end of the rod 15 as well as the rod 16 whereby the brackets serve to connect the rod ends. As is most clearly shown in Fig. 2, the bracket 17 includes a flat, horizontal plate 18 of greater length than width having vertical, depending flanges or legs 19 and 20 at its ends. The end of the rod 15 abuts and is connected to the inner end flange 19, while the plate 18 has the end of the rod 16 abutted against and attached thereto. Thus, the connected ends of the rods extend at right angles to each other. It is noted that the outer flange 20 is preferably of less length than the inner flange and is adapted to overlie the outer surface of the channel when the bracket is engaged thereover with its plate resting thereupon.

The length of the plate is greater than the width of the channel so as to provide a space between said channel and the inner flange 19. A yoke or U-shaped element 21, having an intermediate plate or web 22 and lateral flanges or arms 23, is welded or otherwise secured within the bracket 17 with its web and arms depending from the intermediate portion of the plate, whereby the ends of the arms overlie the vertical edge portions of the inner flange (Fig. 5). The web 22, which is of substantially the same width and length as the bracket inner flange, is adapted to engage and extend parallel to the inner surface of the channel 13, whereby said web coacts with the outer portion of the plate and its outer flange to provide a clip or keeper 24 for snugly receiving said channel. An enclosure or box 25 is formed by the coaction of the yoke 21 with the inner portion of the plate and its inner flange for housing a latch 26.

The latch 26 includes an element or plunger 27, preferably of cylindrical shape, which is slidably engaged in and projects through alined openings 28 and 29 formed in the central portion of the inner flange 19 and web 22, respectively. An opening 30 is formed in the channel 13 for receiving the outer end of the plunger 27 and this opening is preferably at the upper end of one of the stakes 11 so that said plunger end bears against said stake. For confining the plunger within the openings 28 and 29, a transverse or diametric pin 31 is carried by said plunger with its ends extending through alined, elongate openings 32 formed in the arms 23. A spring 33 is confined upon the inner end of the plunger between the flange 19 and a washer 34 which bears against the pin 31, whereby said plunger is constantly urged outwardly. Due to the provision of the pin, the plunger may be readily retracted for engagement with and detachment from the channel opening 30.

Although the brace 14 has been shown and described as including both the straight rod 15 and the arched or bowed rod 16, it is manifest that either may be omitted. As shown in Fig. 3, the rod 16 may be eliminated and the brace merely consist of the rod 15 with a bracket 17 mounted on each end thereof. The latter rod may be dispensed with as shown in Fig. 4, whereby the rod 16 and a pair of the brackets 17 make up the brace. It is noted that the rod 16 is desirable for supporting canvas tops or tarpaulins and increases the head room. Additional rigidity is provided by the use of both bars.

The simplicity of construction permits the use or installation of the braces for reinforcing the side racks or panels of an open top vehicle by merely drilling a transverse opening near the top of each rack or panel for each bracket latch. When not desired or necessary, the brace is readily detached and removed. It is preferable to attach the brace at or near the stakes in order to provide a more rigid connection and support for the brace. Although not illustrated, any number of braces are adapted to be used in connecting the sides of an open top vehicle.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a vehicle having upright sides, a brace for connecting the upper portions of the sides including, a member extending transversely of the sides, a connecting element mounted on each end of the member and having a U-shaped keeper for overlying the upper portion of the side, the keeper having depending flanges with its outer flange engaging the outer surface of the side and its inner flange engaging the end of said member and spaced from the side, and a spring-pressed plunger supported by said element between the inner and outer flanges of its keeper for detachably latching the keeper on the side, the upper portion of the side having a transverse opening for receiving the plunger.

2. In a vehicle having upright sides, a brace for connecting the upper portions of the sides including, a pair of parallel members extending transversely of the sides, one member being straight and the other member being bowed upwardly, an element on each end of the brace rigidly connecting the adjacent ends of the members, each element having a keeper for receiving the upper portion of the side, and a spring-pressed plunger mounted in each element for detachably latching the keeper on the side, the upper portion of the side having a transverse opening for receiving the plunger.

3. In a vehicle having upright side panels, a brace for connecting the upper portions of the side panels including a transverse member, a U-shaped bracket projecting longitudinally from each end of the member so as to overlie the upper portion of each panel, the bracket having depending flanges with its outer flange engaging the outer surface of the panel and its inner flange spaced from said panel, a yoke depending from said bracket between its inner flange and said panel and having longitudinal arms, the margins of the arms being secured to said inner flange to form an enclosure, and a latch within the enclosure for detachably connecting said bracket to said panel.

4. In a vehicle having upright side panels, a brace for connecting the upper portions of the side panels including, a member adapted to extend transversely between said panels, a U-shaped bracket projecting longitudinally from each end of the member so as to overlie the upper portion of each panel, the bracket having depending flanges, a yoke depending from the intermediate portion of said bracket and having longitudinal arms with their inner margins secured to the bracket inner flange, the yoke being spaced from the bracket outer flange to provide a keeper therebetween for receiving the upper portion of the panel, said inner flange and yoke having alined openings, and a spring-pressed plunger slidably engaged within and projecting through the openings for engaging said panel to detachably connect the brace thereto.

EDMUND S. GRILLEY.

REFERENCES CITED

The following references are of record in the file of this patent:

UNITED STATES PATENTS

| Number | Name | Date |
|---|---|---|
| 541,094 | Johnson | June 18, 1895 |
| 2,368,405 | Black | Jan. 30, 1945 |
| 2,425,875 | Hermann | Aug. 19, 1947 |
| 2,450,589 | Falk et al. | Oct. 5, 1948 |